United States Patent [19]

Sauter

[11] 4,189,951
[45] Feb. 26, 1980

[54] ANTI-BACKLASH GEAR

[75] Inventor: Charles A. Sauter, Westbury, N.Y.

[73] Assignee: Bulova Watch Company, Inc., Flushing, N.Y.

[21] Appl. No.: 919,542

[22] Filed: Jun. 27, 1978

[51] Int. Cl.[2] ............................................. F16H 55/18
[52] U.S. Cl. ................................... 74/440; 29/159.2; 74/449
[58] Field of Search ................ 74/409, 411, 440, 444, 74/449, 406, 410, 439, 445; 29/159.2, 463

[56] References Cited

U.S. PATENT DOCUMENTS

| | | | |
|---|---|---|---|
| 1,197,261 | 9/1916 | Burke | 74/443 |
| 1,539,149 | 5/1925 | Thornburg | 33/147 R |
| 1,647,480 | 11/1927 | Starkey | 74/440 |
| 2,061,684 | 11/1936 | Spence, Jr. | 74/440 |
| 2,206,831 | 7/1940 | Berthelsen | 74/466 |
| 2,845,809 | 8/1958 | Hetzel | 29/159.2 |
| 2,928,288 | 3/1960 | Bliss et al. | 74/440 |
| 2,966,806 | 1/1961 | Luning | 74/440 |
| 3,127,784 | 4/1964 | O'Neill | 74/440 |
| 3,296,881 | 1/1967 | Seabeck | 74/440 |
| 3,357,273 | 12/1967 | Larson et al. | 74/440 |
| 3,359,819 | 12/1967 | Veillette et al. | 74/439 |
| 3,385,126 | 5/1968 | Finch | 74/440 |
| 3,407,727 | 10/1968 | Fischer | 101/177 |
| 3,535,948 | 10/1970 | Winzeler et al. | 74/440 |

OTHER PUBLICATIONS

Product Engineering Catalog, "18 Ways to Control Backlash in Gearing," Oct. 26, 1959.

Primary Examiner—C. J. Husar
Assistant Examiner—Conrad Berman
Attorney, Agent, or Firm—Michael Ebert

[57] ABSTRACT

An anti-backlash twin gear formed by a pair of identical half-gears, each fabricated by stamping a metal sheet to create a toothed wheel provided with a diametrical spoke having a central mounting bore. The arched area between one side of the spoke and one half section of the wheel is fully excised to form an open region, whereas the arched area between the opposite side of the spoke and the other half section of the wheel is contour-cut to define a C-shaped flat spring whose foot is integral with the spoke. The spring is offset from the plane of the wheel whereby when the pair of half-gears are juxtaposed, the untensioned spring of each half gear is received within the open region of the other and the free end of the spring abuts the edge of the spoke flanking this region to effect a slight angular displacement of the half-gear. When the twin gear is intermeshed with a driving pinion engaging both half gears thereof, the springs are then tensioned to cause the half-gears to exert pressure on opposite tooth flanks of the pinion, thereby avoiding lost motion.

5 Claims, 11 Drawing Figures

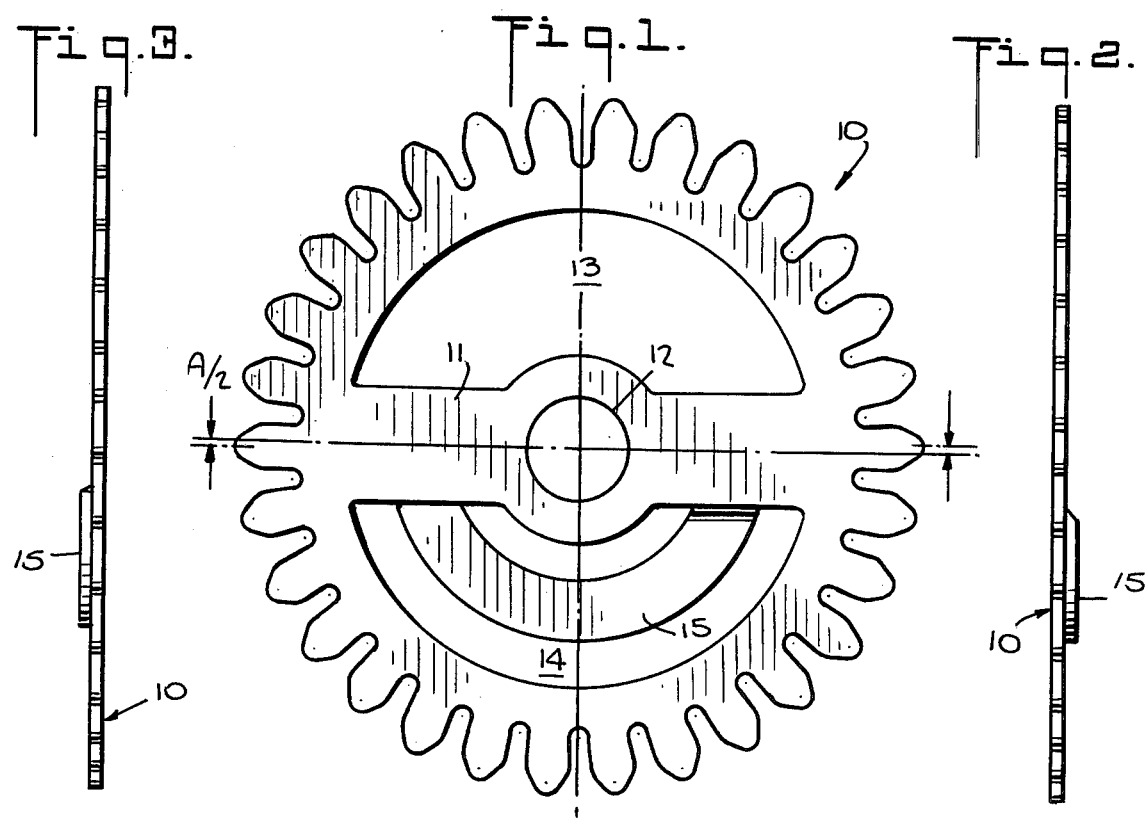
Fig. 3. Fig. 1. Fig. 2.
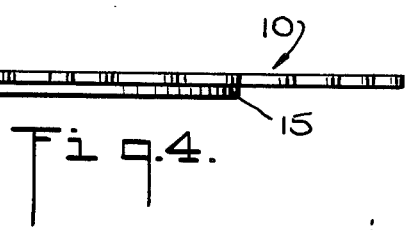
Fig. 4.
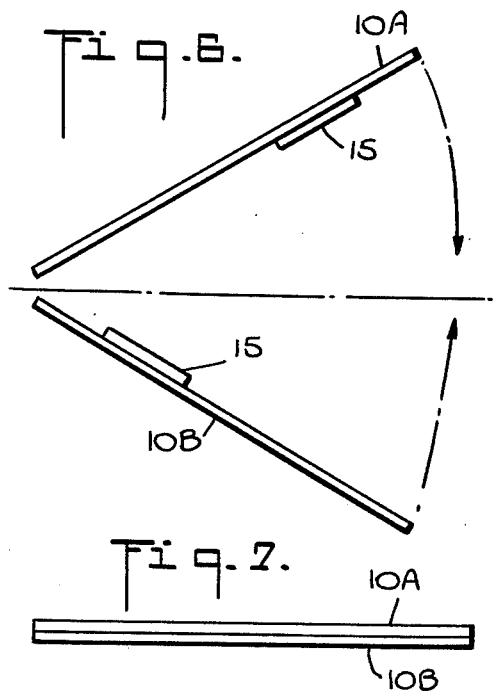
Fig. 6.
Fig. 7.
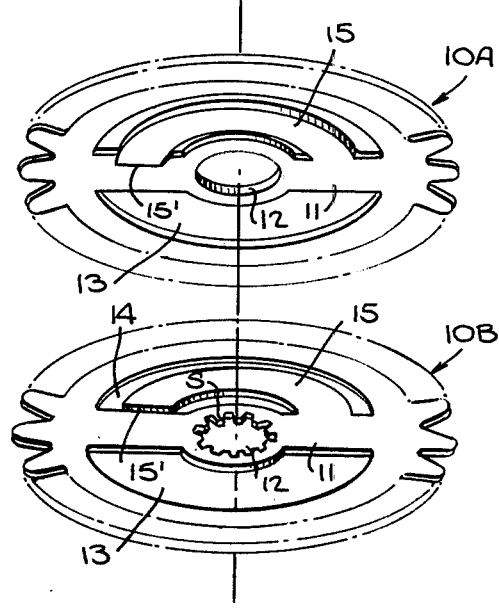
Fig. 5.

ANTI-BACKLASH GEAR

BACKGROUND OF INVENTION

This invention relates generally to anti-backlash gears, and more particularly to an anti-backlash twin gear composed of a pair of identical half-gears, no additional components such as springs being required.

Backlash refers to the lost motion between two intermeshed gears due to imperfect meshing of the gear teeth. Backlash is therefore the amount a drive gear must move before it transmits its motion to the gear driven thereby. In certain practical situations, the existence of backlash in a gear train transmitting power or motion cannot be tolerated.

For example, in an electronic timepiece, electrical timing pulses are generated which serve to actuate a stepping motor whose shaft is operatively coupled through a gear train to time-indicating hands. Should backlash exist between the drive pinion and the minutes wheel in the train, this permits the minute hand to float. As a consequence, the minute indication may be off by as much as one to three minutes.

Since a modern crystal-controlled electronic timepiece is inherently capable of providing highly accurate time indications, a one or two minute error by reason of mechanical backlash is not acceptable. Similarly, in servomechanisms and in variable speed drive mechanisms in which motion is transmitted through gears, the existence of backlash is often objectionable.

In order to avoid backlash, it is known to make use of anti-backlash gears of the double or split type constituted by two gear wheels of the same diameter and pitch, referred to as half-gears. One such half-gear is secured to a driven shaft while the other is free-running thereon, the two half gears being spring coupled to each other. In this arrangement, the bias developed by the spring normally acts to angularly displace the two half-gears so as to exert pressure on opposite tooth flanks of a driving pinion adapted to engage both half gears, thereby precluding lost motion.

The pre-loading of half-gears by compression or extension springs has a number of disadvantages; for the uniformity of the springs, their loading and the degree of displacement are very difficult to control. Moreover, gears pre-loaded by helical springs are generally restricted to relatively broad gears, whereas in many applications, such as in watches and other small instruments, the need exists for extremely thin anti-backlash gears.

Another practical drawback of anti-backlash gears of the type heretofore known, apart from the fact that such gears entail springs, restraining pins and other separate components which make assembly procedures complex and costly, is that the two half-gears are not identical, but are constituted by right- and left-hand units. These units must be separately fabricated and stocked, further complicating assembly procedures and adding to the expense of producing an anti-backlash gear.

Another limitation of conventional types of anti-backlash gears of the double type is that the displacement torque developed by the springs is relatively high, thereby introducing friction to the gears in mesh and requiring additional torque to drive the gear train. In the context of a battery-powered electronic timepiece, this requirement is a serious disadvantage, for it increases the energy demand and is reflected in shortened battery life.

Among the patents which disclose diverse forms of spring-biased twin gear arrangements adapted to minimize backlash are the following:

O'Neill U.S. Pat. No. 3,127,784
Finch U.S. Pat. No. 3,385,126
Thornburg U.S. Pat. No. 1,539,149
Fischer U.S. Pat. No. 3,407,727
Bethelsen U.S. Pat. No. 2,206,831
Winzeler et al. U.S. Pat. No. 3,535,948
Seabeck U.S. Pat. No. 3,296,881
Burke U.S. Pat. No. 1,197,261
Bliss et al. U.S. Pat. No. 2,928,288
Larson et al. U.S. Pat. No. 3,357,273

SUMMARY OF INVENTION

In view of the foregoing, it is the main object of this invention to provide an anti-backlash twin gear formed by identical half-gears and no other components, whereby the necessary spring tension is built into the structure.

A significant feature of the invention is that the half-gears are producible by press work, thereby eliminating the cost of secondary machining and assembly operations. Because the half-gears have a shape whose side-to-side symmetry allows both gears to be identical, this cuts the cost of tooling in half, and it obviates the need to identify right- and left- hand units during assembly and stock handling. Hence, the twin gears may be mass-produced and readily assembled at relatively low cost.

More particularly, it is an object of the invention to provide half-gears for forming half-gear pairs which are precisely offset to achieve the desired degree of anti-backlash meshing, no adjustments in offset being required in the course of gear assembly.

Also, an object of this invention is to provide a twin anti-backlash gear formed by a pair of identical half-gears whose overall thickness is small, the gear being free of protrusion. The twin gear is therefore suitable for miniature timepiece movements, and for other applications where gear thinness is a desideratum.

Briefly stated, half-gears in accordance with the invention are fabricated by stamping out a metal sheet to create a toothed wheel provided with a diametrical spoke having a center mounting bore. The arched area between one side of the spoke and one half section of the wheel is fully excised to form an open region, whereas the arched area between the other side of the spoke and the other half section of the wheel is contour-cut to define a C-shaped flat spring whose foot is integral with the spoke.

In one preferred embodiment of the invention, the spring is bent to offset it with respect to the plane of the wheel whereby when a pair of such half-gears are juxtaposed to form a twin gear, the untensioned spring of each half gear is received within the open region of the other and the free end thereof abuts the edge of the spoke flanking this region to effect a slight angular displacement of the half-gears, thereby causing the teeth of the half gears to overlap. When the twin gear is intermeshed with a pinion adapted to engage both half-gears, the springs are then tensioned, thereby exerting pressure on opposite tooth flanks of the pinion to avoid lost motion.

OUTLINE OF DRAWINGS

For a better understanding of the invention, as well as other objects and further features thereof, reference is made to the following detailed description to be read in conjunction with the accompanying drawings, wherein:

FIG. 1 is a plan view of a half-gear for forming a twin anti-backlash gear in accordance with one preferred embodiment of the invention;

FIG. 2 is an east side view of the half-gear as seen in a plane at right angles to the spoke axis of the half-gear;

FIG. 3 is a west side view of the half-gear;

FIG. 4 is a south side view of the half-gear;

FIG. 5 is a perspective view of a pair of these half-gears in the course of being juxtaposed to form a twin gear;

FIG. 6 is a top view of the half-gears in the course of being juxtaposed;

FIG. 7 is a top view of the resultant twin gear;

DESCRIPTION OF INVENTION

First Embodiment

Figure 8:
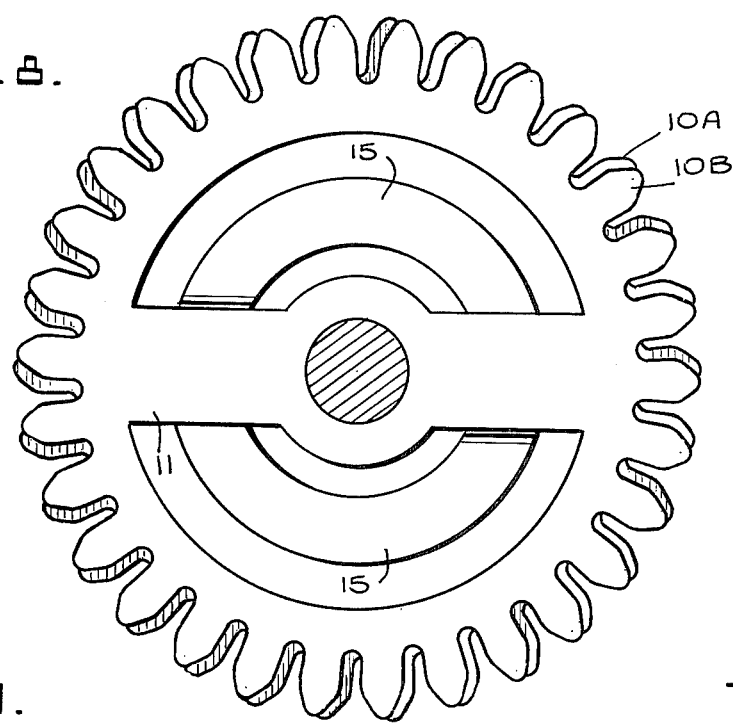
FIG. 8 is a plan view of the twin gear in its untensioned state.
Figure 10:
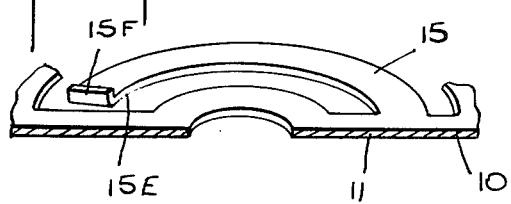
FIG. 10 is a partial showing, in perspective, of a second preferred embodiment of a half-gear.

Referring now to FIGS. 1 to 4, there is shown a toothed wheel 10 which is stamped out of sheet metal or otherwise fabricated to constitute a half gear. An identical pair of complementary half gears form an anti-backlash gear in accordance with the invention. The advantage of stamping out half-gears is that this operation lends itself to low-cost mass production of anti-backlash gears and obviates the need for secondary machinery and other operations.

Half-gear 10 includes a diametrical spoke 11 having a center mounting bore 12 to receive an arbor. The arched area 13 between the upper side of spoke 12 and the upper half section of the wheel is fully excised to create an open region. The arched area 14 between the lower side of spoke 12 and the lower half section of the wheel is contour cut to define a C-shaped flat spring 15 whose foot is integral with the spoke and whose other end is free.

Spring 15 is bent to offset it with respect to the plane of the wheel, so that the body of the spring is parallel to the body of the wheel. Since the spring has the same thickness as the wheel, the overall thickness of the half-gear is twice the thickness of the wheel.

When, as shown in FIGS. 5, 6 and 7, a pair of identical half-gears 10A and 10B are juxtaposed to form a twin gear, the half gears are positioned to complement each other so that spring 15 of half gear 10A is received within the open region 13 of half-gear 10B while spring 15 of half gear 10B is received within the open region 13 of half-gear 10A. The free end 15' of spring 15 of half-gear 10A abuts the edge of spoke 11 flanking the free region 13 of half gear 10B while the free end 15' of spring 15 of half-gear 10B abuts the edge of spoke 11 flanking the free region 13 of half gear 10A.

Thus, as shown in FIG. 8, in the untensioned state of the springs, half gears 10A and 10B of the mated pair have a slight angular displacement or offset therebetween, causing the teeth of these half-gears to overlap. As shown in FIG. 1, this offset A/2 is between the axis of the spoke and the center line of opposing teeth on gears with even numbered teeth. Here the dimension A is the desired number of teeth to be offset, which on coarse pitched gears provided with substantial spring tension, may be less than one tooth pitch.

Figure 9:
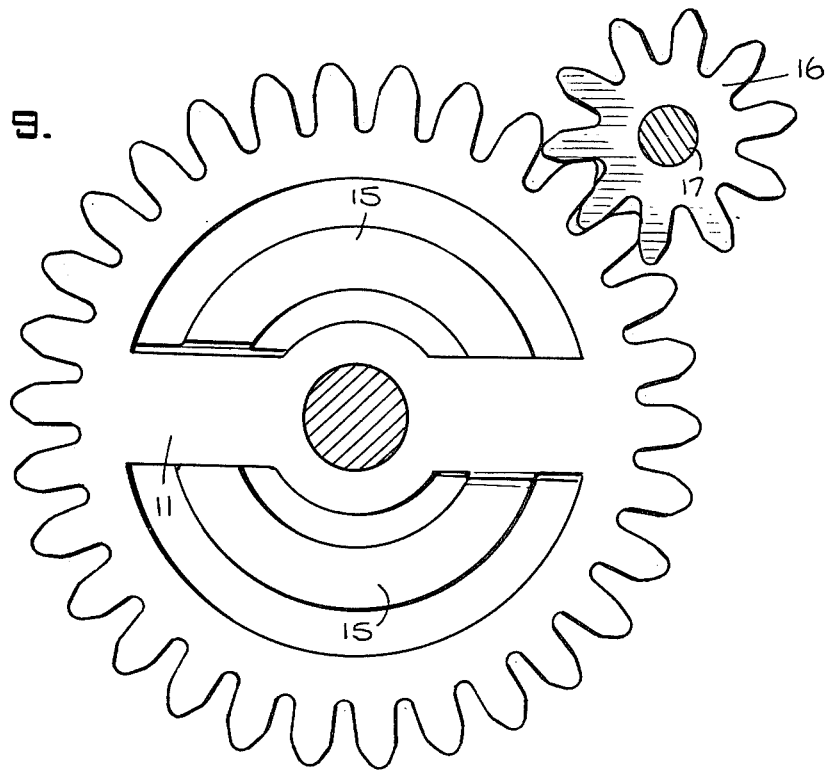
FIG. 9 shows the twin gear in the tensioned state in intermeshing relationship with a pinion.

In FIG. 8, the complementary half-gears forming the anti-backlash gear is unstressed; hence the gear overlap. In FIG. 9, however, where the teeth of the half-gears are engaged by the teeth of a drive pinion 16 mounted on a shaft 17, the drive pinion teeth impose a stress on the springs of the half-gears so that the teeth of the half-gears press against the flanks of the pinion gear teeth to provide zero backlash.

It is important to note that the overall thickness of the anti-backlash gear is exactly twice the thickness of a half-gear, for the offset springs of each half gear are received within the open region of the other. Consequently, there are no protuberances from the anti-backlash gear, making this thin gear suitable for miniature timepieces. The characteristics of the spring may be modified by tapering or otherwise shaping the spring in accordance with well-known spring design principles.

Second and Third Embodiments

Figure 11:
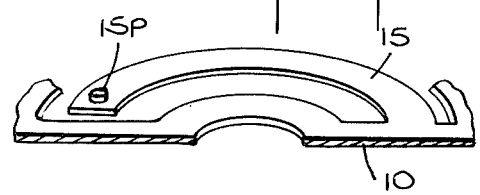
FIG. 11 is a partial showing, in perspective, of a third preferred embodiment of a half-gear.

Instead of offsetting spring 15 from the plane of the wheel from which it is struck, the spring may be maintained in the same plane, as shown in FIG. 11; and in order to effect engagement with the edge of spoke 11 of the complementary half-gear, the free end 15E of spring 15 is bent outwardly to define a flange 15F. The height of this flange is equal to the thickness of the wheel so that it does not protrude beyond the open region of the complementary half gear.

Instead of bending the free end of spring 15, one may, as shown in FIG. 11, attach a pin 15P, thereto, for the same purpose.

In making use of an anti-backlash gear in accordance with the invention, the drive, therefor, is operatively coupled to one half gear, while the other half gear overrides the drive. For example, as shown in FIG. 5, bore 12 of half gear 10B is provided with a spline S appropriate to a spline drive, the half gear 10A overriding the spline, thereby maintaining the thinness of the backlash twin gear while making it capable of doing work at a mechanical advantage. Alternatively, instead of a spline, one may provide half gear 10B with a hub (not shown) for the same purpose.

While there have been shown and described preferred embodiments of an anti-backlash gear in accordance with the invention, it will be appreciated that many changes and modifications may be made therein without, however, departing from the essential spirit thereof.

I claim:

1. An anti-backlash twin gear constituted by a pair of half-gears, each half-gear comprising a toothed wheel stamped out of sheet metal and provided with a diametrical spoke having a center mounting bore, the arched area between one side of the spoke and one half-section of the wheel being fully excised to form an open region, the arched area between the opposite side of the spoke and the other half-section being contour-cut to define a C-shaped untensioned flat spring whose foot is integral with said spoke, the spring having an element at the free end thereof which is offset with respect to the plane of the wheel whereby when a pair of such half gears are juxtaposed so that the offset element of each half-gear is received within the open region of the other and abuts the edge of the spoke forming this region, the two half-gears are angularly displaced by the untensioned springs to a predetermined degree to produce an anti-backlash twin gear in which the corresponding teeth of the half-gears overlap, and when this twin gear is intermeshed with a driving pinion engaging both half-gears, the springs are then tensioned, thereby exerting pressure on opposite tooth flanks of the pinion to avoid lost motion.

2. An anti-backlash gear as set forth in claim 1, wherein the body of said spring is offset with respect to the plane of the wheel and wherein said element is constituted by the free end of the spring.

3. An anti-backlash gear as set forth in claim 1, wherein said element is defined by the free end of said spring which is bent with respect to the body thereof.

4. An anti-backlash gear as set forth in claim 1, wherein said element is defined by a pin attached to the free end of said spring and projecting laterally therefrom.

5. An anti-backlash gear as set forth in claim 1, wherein said half gear has an even number of teeth.

* * * * *